(12) United States Patent
Oboodi et al.

(10) Patent No.: US 8,158,205 B2
(45) Date of Patent: Apr. 17, 2012

(54) METHODS OF FORMING SOLID LUBRICANT COATINGS ON SUBSTRATES

(75) Inventors: Reza Oboodi, Morristown, NJ (US); James Piascik, Morristown, NJ (US); Bjoern Schenk, Commugny (CH); Eric Passman, Morristown, NJ (US); Richard Bye, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 349 days.

(21) Appl. No.: 12/479,034

(22) Filed: Jun. 5, 2009

(65) Prior Publication Data

US 2010/0310763 A1 Dec. 9, 2010

(51) Int. Cl.
*B05D 3/02* (2006.01)
(52) U.S. Cl. ..................... 427/376.1; 427/380
(58) Field of Classification Search ............... 427/376.1, 427/380
See application file for complete search history.

(56) References Cited

U.S. PATENT DOCUMENTS

| | | | |
|---|---|---|---|
| 3,677,612 A * | 7/1972 | Barnett et al. | 384/12 |
| 3,953,343 A * | 4/1976 | Sliney | 508/104 |
| 5,271,956 A | 12/1993 | Paz-Pujalt | |
| 5,766,690 A | 6/1998 | Derby et al. | |
| 5,866,518 A | 2/1999 | Dellacorte et al. | |
| 2005/0163406 A1 | 7/2005 | Oboodi et al. | |
| 2006/0147699 A1 * | 7/2006 | Sarkar et al. | 428/323 |
| 2010/0028718 A1 * | 2/2010 | Oboodi et al. | 428/697 |

OTHER PUBLICATIONS

Content of http://www.alloywire.com/rene_41.html retrieved Nov. 30, 2011.*
PCT Search Report, PCT/US2010/038997 dated Jan. 12, 2011.

* cited by examiner

*Primary Examiner* — Nathan Empie
(74) *Attorney, Agent, or Firm* — Ingrassia Fisher & Lorenz, P.C.

(57) ABSTRACT

A method includes applying a coating precursor material over a substrate, the coating precursor material comprising a powder having an average particle diameter in a range of about 10 nanometers to about 10 microns comprising a fluoride eutectic, a metal capable of oxidizing at about 535° C. to about 800° C., one or more materials selected from the group consisting of a metal oxide, a glass, a carbide, and a nitride, and optionally, a precious metal selected from silver, palladium, platinum, gold, rhodium, and alloys thereof, subjecting the coating to a sintering heat treatment, occurring at a first temperature in an inert or reducing atmosphere to sinter the metal of the precursor material, and exposing the coating to an oxidizing heat treatment performed in an oxidizing atmosphere at a second temperature that is less than the first temperature to oxidize a portion of the metal in the coating precursor material.

14 Claims, 2 Drawing Sheets

METHODS OF FORMING SOLID LUBRICANT COATINGS ON SUBSTRATES

TECHNICAL FIELD

The inventive subject matter generally relates to coatings, and more particularly relates to methods of forming solid lubricant coatings on substrates.

BACKGROUND

Turbochargers are generally used to enhance operability of a device. For example, in the context of turbine engines, turbochargers may be used to increase pressurization, or to boost, an intake air stream into a combustion chamber. In this regard, hot exhaust gas from the engine may be routed into a turbocharger turbine housing within which a turbine is mounted. The exhaust gas flow impinges against the turbine to cause it to spin. Because the turbine is mounted on one end of a shaft that has a radial air compressor mounted on an opposite end, rotary action of the turbine also causes the air compressor to spin. The spinning action of the air compressor causes intake air to enter a compressor housing and to be pressurized, or boosted, before the intake air is mixed with fuel and combusted within an engine combustion chamber.

To reduce friction between and to extend the useful life of the turbocharger or other turbomachinery, foil bearings may be used to support rotating components of the turbine engines, turbochargers, and the like. Generally, a foil bearing includes a journal mounted to the rotating component and a cylindrical top foil disposed around the journal. The journal and top foil are configured such that when the rotating component rotates at an optimum operational speed, the foil and the journal separate from each other to form an air gap. As the air gap between the foil and the journal grows, pressurized air is drawn in to serve as a load support and act as a lubricant to the rotating component and surrounding static components.

In the absence of the pressurized air between the journal and the top foil, the two components will come into contact with each other. Thus, to protect the components from premature wear, one or more of the components may include a solid lubricant coating thereon. Some known solid lubricants include metal oxides, such as chromium oxide, nickel oxide, cobalt oxide, titanium oxides, or oxide blends, or mixtures thereof. Other solid lubricants may include metals that are bonded with metal oxides, which are then blended with a fluoride.

Although the aforementioned solid lubricants provide excellent lubrication between rubbing components and are chemically stable at elevated temperatures (e.g., temperatures above 480° C.), they may be improved. For example, because the aforementioned solid lubricants are typically plasma-sprayed onto the component, thin components (e.g., components having a thickness of less than about 0.01 cm, such as foils of a foil bearing system) may become distorted during the plasma spray process. Hence, application of the solid lubricants may be limited to thicker components. In the case of the foil bearing system, the thicker component may comprise a moving part of the foil bearing (e.g., the journal or thrust runner), and wear may occur on the journal or thrust runner, which may create an imbalance in the foil bearing system. For example, when the foil bearing system is pressurized during normal operation and subjected to high intermittent loads, the coating on the foil component can come in contact with the journal. However, because the moving part of the foil bearing may not be capable of being "broken in" (e.g., where minor distortions on a surface of the moving part of the foil bearing are abraded away), the moving part may continue to create imbalance in the foil bearing, which may decrease load capacity and stability of the foil bearing over time. For example, in some cases, a "high spot" may be present on a stationary part of the foil bearing (e.g., a mating foil), and a coating on the moving part of the foil bearing system (e.g., the journal) may wear over the complete circumference. As a result, the wear on the foil bearing system may become amplified, and the surface finish of the foil bearing system may undesirably increase thereby reducing the load capacity and/or decreasing lifetime.

In another example, plasma-sprayed solid lubricant coatings may have a relatively high porosity and large particle size, which may render the coatings difficult to polish to a desired surface finish which in turn may limit load capacity of the foil bearing. Furthermore, traditional solid lubricant coatings may be limited to use in temperature environments below about 300° C., and thus, extensive cooling may be required if the foil bearings are to be employed at temperatures above 300° C. However, even if the components are suitably cooled, coking deposits may accumulate during operation and may interfere with the operation and/or decrease the lifetime of the foil bearings.

Accordingly, it is desirable to have a solid lubricant that may be applied to thin components and may be polished to a surface finish of less than about 0.20 micron (8 microinches). Additionally, it is desirable for the solid lubricant and methods of applying the solid lubricant to be relatively simple and inexpensive to apply. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods are provided for forming a solid lubricant coating on a substrate.

In an embodiment, by way of example only, a method includes applying a coating precursor material over the substrate, the coating precursor material comprising a powder having an average particle diameter in a range of about 10 nanometers to about 10 microns, wherein the precursor material comprises a fluoride eutectic, a metal capable of oxidizing at about 535° C. to about 800° C., one or more materials selected from the group consisting of a metal oxide, a glass, a carbide, and a nitride, and optionally, one or more precious metals selected from the group consisting of silver, palladium, platinum, gold, and rhodium, subjecting the precursor material over the substrate to a sintering heat treatment to form a intermediate coating, the sintering heat treatment occurring at a first temperature in an inert atmosphere or a reducing atmosphere to sinter the metal of the precursor material, and exposing the intermediate coating to an oxidizing heat treatment, the oxidizing heat treatment performed in an oxidizing atmosphere at a second temperature that is less than the first temperature to oxidize a portion of the metal in the intermediate coating.

In another embodiment, by way of example only, a method includes applying a coating precursor material over the substrate, the coating precursor material including a powder having average particle diameters in a range of from about 10 nanometers to about 10 microns, wherein the coating precursor material comprises a fluoride eutectic, a metal capable of oxidizing at about 535° C. to about 800° C., one or more precious metals selected from the group consisting of silver, palladium, platinum, gold, and rhodium, and one or more materials selected from the group consisting of a metal oxide, a glass, a carbide, and a nitride, subjecting the precursor material over the substrate to a sintering heat treatment to form a first intermediate coating, the sintering heat treatment occurring at a first temperature in a range of from about 900° C. to about 1000° C. in an inert or reducing atmosphere, applying an intervening layer over the first intermediate coating and subjecting the first intermediate coating with the intervening layer on top to a sintering heat treatment to form a second intermediate coating, the sintering heat treatment occurring at a second temperature in an inert or reducing atmosphere, the intervening layer comprising a second fluoride eutectic, exposing the second intermediate coating to an oxidizing heat treatment to form a third intermediate coating, the oxidizing heat treatment performed at a third temperature in a range of from about 535° C. to about 800° C. to oxidize a portion of the metal of the second intermediate coating material to form the solid lubricant coating, and polishing the solid lubricant coating to a surface finish of less than about 0.20 micron (8 micro-inches).

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
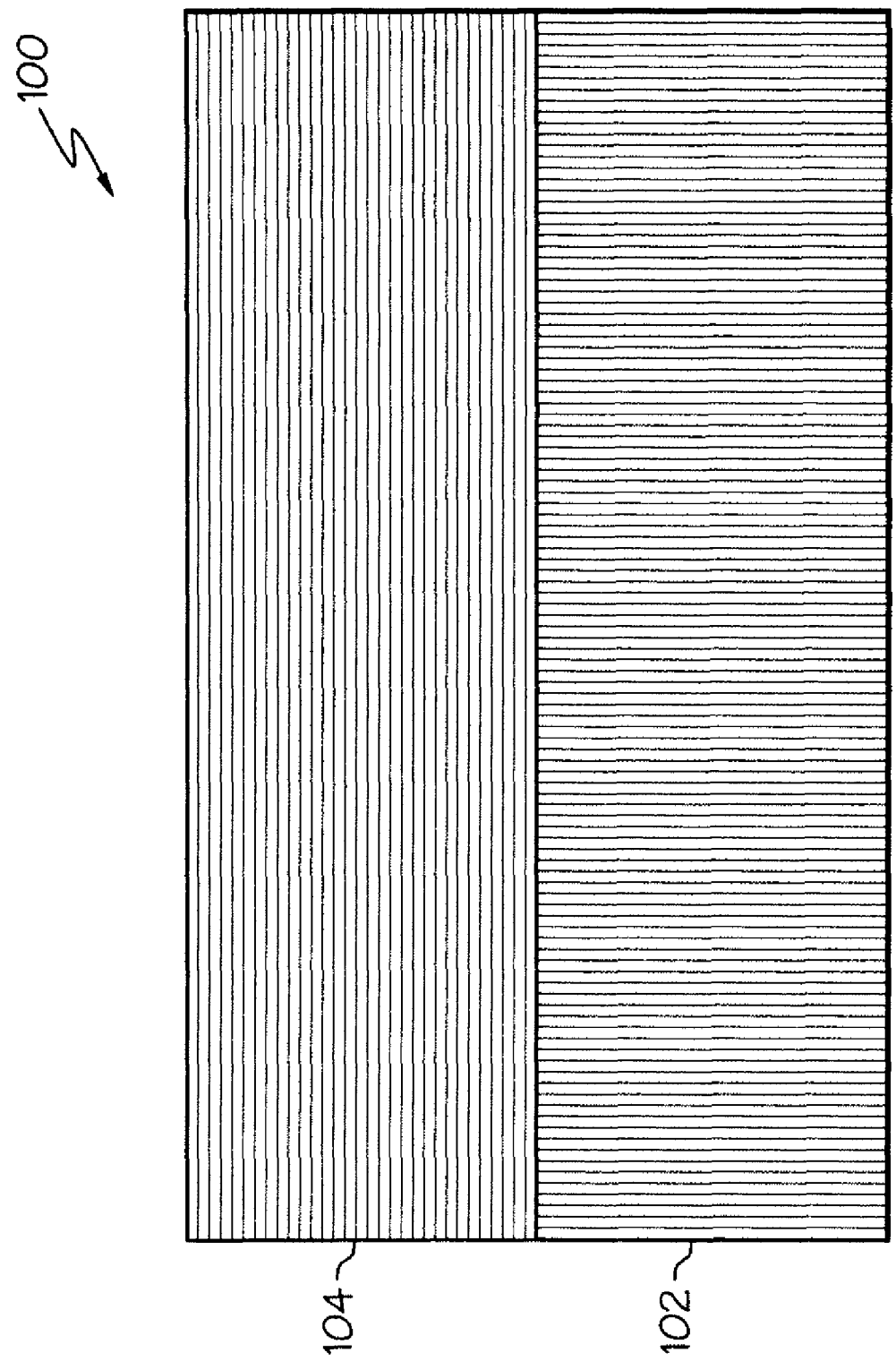
FIG. 1 is a cross-sectional view of a portion of a component, according to an embodiment.

FIG. 1 is a cross-sectional view of a portion of a component 100, according to an embodiment. In an embodiment, the component 100 may comprise or may be coated with one or more solid lubricant materials capable of exhibiting lubricating characteristics over a wide range of temperatures. In an example, the component 100 may be capable of exhibiting lubricating characteristics while operating in low temperature environments (e.g., temperatures less than about −50° C.) and in high temperature environments (e.g., at temperatures greater than about 482° C.). Additionally, by including a coating formulated and applied by the manner described below, the component 100 may be relatively thin-walled (e.g., having a thickness of about 0.01 cm or less) or may be relatively thick-walled. A surface of the component 100 including the solid lubricant materials may be polished to a surface finish of about 0.20 micron (8 micro-inches) or less.

According to an embodiment, the component 100 may be included as part of a rotating assembly, such as a foil bearing, journal bearing, roller bearing or the like or as part of a stationary assembly. In an example, the component 100 may be a rotating component of a bearing, such as a journal or a thrust runner, or may be a stationary component of an air bearing, such as a foil. In another embodiment, the component 100 may be a rotating or a stationary turbine blade, airfoil, impeller, shroud, housing, strut, or other component. In any case, the component 100 may include a substrate 102 having a coating 104. The substrate 102 may be made of a metal, such as a nickel-based alloy such as Inconel X-750, a cobalt-based alloy, and the like or other materials typically used for machine components. Although the portion of the substrate 102 of FIG. 1 is shown to have a rectangular cross section, substrates may have different geometrical cross-sectional shapes, in other embodiments.

The coating 104 is disposed over the substrate 102, and although the coating 104 is shown as being disposed directly on the substrate 102, one or more intervening layers (not shown) may be included as part of coating 104 in other embodiments. For example, an intervening layer comprising a fluoride eutectic may be included as part of the coating 104 In either case, the coating 104 may have a thickness in a range of about 0.0001 centimeter (cm) to about 0.01 cm, in an embodiment. In other embodiments, the coating 104 may be thicker or thinner than the aforementioned range.

In accordance with an embodiment, the coating 104 has a formulation that may include one or more fluoride eutectics, one or more metals, and one or more materials capable of acting as a low temperature lubricant. In another embodiment, the coating 104 has a formulation that may include one or more fluoride eutectics, one or more metals, one or more materials capable of acting as a low temperature lubricant, and one or more materials capable of acting as a high temperature lubricant. In either embodiment, the coating 104 may be precious metal-free. To improve sintering and densification of the coating 104 and to improve homogeneity of the coating 104, the metals, low temperature lubricant materials, and high temperature lubricant materials, if included, may have average particle diameters that fall within a range of about 10 nanometers (nm) to about 10 microns (μm). In a preferred embodiment, the average particle sizes may be in a range of about 20 nm to about 3000 nm. In other embodiments, the particle sizes may be larger or smaller than either of the two aforementioned ranges.

The fluoride eutectic is selected for having a softening point at a temperature that is below a maximum processing temperature used during a coating formation process, in an embodiment. As used herein, the term "softening point" may be defined as a temperature at which an inorganic becomes semi-fluid. For example, in a coating formation process in which a maximum processing temperature is about 1000° C., the fluoride eutectic may be selected to have a softening point temperature that is lower than about 1000° C. In another example, the softening point temperature may be at least about 50° C. lower than the maximum processing temperature. In this way, the fluoride eutectic may soften or melt to flow between the particles and substantially bind other constituents of the coating 104 together or may act as a flux to remove oxide from the individual metal particles to promote metal-metal diffusion. Consequently, the fluoride eutectic may reduce porosity of the coating 104. Suitable fluoride eutectics include, but are not limited to nickel fluoride/cobalt fluoride, barium fluoride/nickel fluoride, cobalt fluoride/barium fluoride, barium fluoride/boron oxide, or any combination of barium fluoride, cobalt fluoride, nickel fluoride, and boron oxide. Inclusion of one or more of the aforementioned fluoride eutectics may improve lubricating properties of the coating 104, in an embodiment. Additionally, high temperature solid lubricant properties may be exhibited by the coating 104 when the coating 104 is employed on components placed in operating environments having operating temperatures that are greater than 200° C., and in some cases, to temperatures of greater than about 650° C. It will be appreciated that the inclusion of the fluoride eutectics may allow the coating 104 to exhibit lubricant properties at temperatures below 535° C., in some embodiments.

The metal included in the coating 104 is selected for an ability to form lubricious oxides when exposed to air at temperatures in a range of about 535° C. to about 800° C. in the presence of a fluoride, in an embodiment. In accordance with another embodiment, the metal is further selected to sinter at a temperature that is lower than a temperature at which an oxidized form of the metal would melt or sinter. In one embodiment, nickel which has a melting point of about 1452° C., may be employed as a metal in the coating 104 and may have a higher melting point when oxidized. In particular, nickel oxide may have a melting temperature of about 1984° C. In another embodiment, chromium may be employed as the metal in the coating 104. Chromium, which has a melting point of about 1615° C., may have a high melting temperature of about 2435° C., when oxidized to form chromium oxide. In still another embodiment, cobalt may be employed. Cobalt has a melting point of about 1465° C. and may form cobalt oxide, when oxidized. Cobalt oxide may have a melting point of about 1935° C. In alternate embodiments, other metals may be employed. In any case, by including metals having the characteristics described above, the metal present on a surface of the coating 104 may oxidize during coating 104 formation to yield metal oxides or additional metal oxides. As a result, the surface of the coating 104 may have a greater concentration of metal oxides than an interior of the coating 104, which may be beneficial because the metal oxides may provide added high temperature solid lubricant properties to the coating 104. A three-dimensional oxidation occurs as well to allow the coating 104 to be polished and improve lubrication properties throughout the bulk of the coating after the oxidation step mentioned below. The three-dimension oxidation prevents removal of a majority of the oxide on the coating 104 during the polishing step below. Moreover, inclusion of the aforementioned metals may yield denser coatings than conventionally-formed plasma sprayed coatings. The resultant coating 104 includes micro-pores that allow oxygen to permeate or diffuse through the surface and bulk of the coating 104 during later heat treatment steps. Consequently, the micro-pores fill with oxide, and the surface finish of the coating may increase during the later heat treatment steps.

In accordance with another embodiment, more than one metal may be included in the coating 104. For example, two metals may be included. In an embodiment, nickel and chromium may be employed. In other embodiments, nickel and cobalt may be employed. In still other embodiments, other combinations of metals may be included. For example, any combination of nickel, cobalt, chromium or other metals, such as molybdenum or tungsten pre-alloyed with nickel, cobalt or chromium, may be included. In still yet other embodiments, more than two metals may be included in the coating 104. If more than one metal is included, the metals may be included at any ratio that optimizes corrosion resistance and/or oxidation in the presence of fluorides, in an embodiment. In another embodiment, the ratio may be selected to optimize tribological characteristics (e.g., friction and/or wear) of the coating 104. In this regard, selection may depend on how the surface finish degrades with a relatively short (e.g., 30 minutes) thermal exposure in air. For example, the ratio may be selected such that the surface finish remains below about 0.20 micron (8 micro-inches) after exposure to a temperature of about 648° C. (1200° F.), so that the coating 104 may be viable for high temperature applications. In an example, the metals may be present at a 3:1 ratio. In another example, the metals may be present at a ratio in a range of 99:1 to 1:99. According to an embodiment in which nickel and cobalt are employed, a ratio in a range of from 75:25 to 85:15 may be employed.

As mentioned previously, the coating 104 may further include one or more materials capable of acting as a low temperature solid lubricant. According to an embodiment, the low temperature solid lubricant material may be selected for being capable of lowering friction between two surfaces in rubbing contact with each other at temperatures lower than about 200° C. In another embodiment, the low temperature solid lubricant material may be selected for being capable of lowering friction between two surfaces in rubbing contact with each other at temperatures lower than about 300° C. In another embodiment, the low temperature solid lubricant material further may be selected for being resistant to oxidation when exposed to high operating environments, such as those operating temperatures that are greater than 535° C., and in some cases, greater than about 650° C. environments. For example, several precious metals may be suitably used as the one or more low temperature solid lubricant materials. In an embodiment, the precious metals may include, but are not limited to, platinum, palladium, gold, silver, rhodium or another precious metal, or alloys/mixtures thereof. In other embodiments, the coating 104 may not include a precious metal, and may include other materials which act as a low temperature solid lubricant. In still other embodiments, other materials, such as copper, may alternatively be employed.

In an embodiment in which one or more materials capable of acting as a high temperature solid lubricant are included, the materials may be selected for being capable of lowering friction between two surfaces in rubbing contact with each other at temperatures higher than about 200° C. In another embodiment, the materials may be selected for being capable of lowering friction between two surfaces in rubbing contact with each other at temperatures higher than about 300° C. In accordance with an embodiment, the high temperature solid lubricant may be further selected for having an ability to provide wear-resistance properties to the solid film lubricant. For example, the high temperature solid lubricant may be a metal oxide, a glass, a nitride or a carbide. In an embodiment, the metal oxide may be substantially similar to or may be identical to the metal oxide formed when the metal oxidizes during coating formation. In other embodiments, the metal oxide may include chromic oxide (e.g., $Cr_2O_3$), nickel oxide, aluminum oxide (e.g., $Al_2O_3$), titanium oxide (e.g., $TiO_2$), cerium oxide, cobalt oxide or another metal oxide. In another embodiment, the nitrides or carbides include, but are not limited to those having the chemical formula $M_{n+1}AX_n$ (hereinafter referred to as "MAX materials"), wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3. Examples of MAX materials include, but are not limited to aluminum-based compounds selected from the group consisting of $Cr_2AlC$, $V_2AlC$, $Ti_2AlC$, $Ti_3AlC_2$, $Ti_4AlN_3$, $Ta_2AlC$, $Ta_4AlC_3$, and $Ti_2AlN$. Another example of a suitable material includes, but is not limited to chromium aluminum carbide ($Cr_2AlC$). In still another embodiment, the high temperature solid lubricant may include a glass. For example, as noted above, boron oxide ($B_2O_3$) may be included, where boron oxide is employed in the coating 104 in a $BaF_2/B_2O_3$ eutectic. In other embodiments, the nitrides and carbides include, but are not limited to hexagonal boron nitride, tungsten carbide, tungsten carbide/cobalt nano-powder (e.g., 85% tungsten carbide and 15% cobalt as a binder) or carbides of chromium, nickel and cobalt or other materials.

Figure 2:
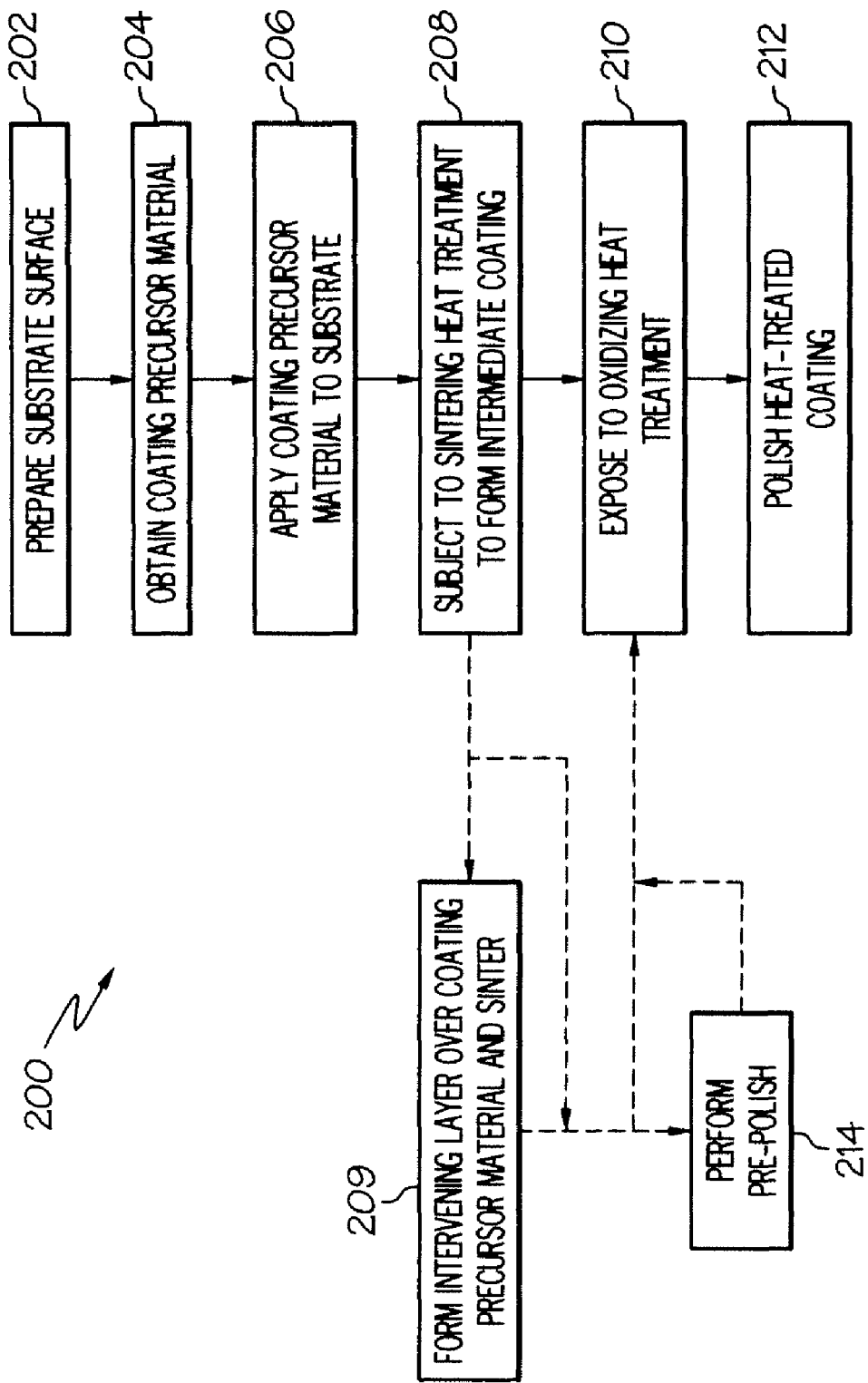
FIG. 2 is a flow diagram of a method of forming a coating over a substrate, according to an embodiment.

To form the coating 104 over the substrate 102, a method 200 depicted in FIG. 2 may be employed. In an embodiment, the method 200 includes preparing a surface of a substrate to be coated, step 202. In an example, surface preparation may include a chemical process. For example, the substrate surface may be chemically etched to provide a micro-roughened surface adapted for bonding coated particles thereto. In an embodiment, the substrate surface may be chemically etched by applying a chemical etchant thereto. Suitable chemical etchants include, but are not limited to, a solution of ferric chloride (e.g., 40 weight % ferric chloride in water) and a dilute mineral acid. In another example, surface preparation may include oxidizing the substrate surface to form an oxide film thereon. In an embodiment, the substrate surface may be oxidized by exposure to heat in the presence of air. For example, the substrate and the air may be heated to a temperature in a range of between about 500° C. to about 1000° C. or any other temperature suitable for promoting oxidation. In still another example, the substrate surface may be cleaned. In one embodiment, the substrate surface is rinsed with deionized water to remove any traces of chemical etchant, if used, or to remove dust or other unwanted particles.

Before, after or substantially simultaneously with step 202, a coating precursor material is obtained, step 204. In an embodiment, the coating precursor material includes the constituents mentioned above and is comprised of at least one or more of the fluoride eutectics, one or more of the metals, and one or more of the low temperature solid lubricants. In another embodiment, the coating precursor material further includes one or more of the high temperature solid lubricants. In an embodiment, one or more of the constituents are prepared by milling, pulverizing, or otherwise transforming the material into a fine powder. In an embodiment, the fine powder may have particle diameters in a range of about 10 nanometers to about 10 microns. In some embodiments, one or more of the constituents may have larger particle sizes. For example, the fluoride eutectic may have average particle diameters in a range of from about 0.1 microns to about 10.0 microns. In other embodiments, the average particle diameters may be larger or smaller than those in the aforementioned ranges.

After the constituents are suitably obtained and/or prepared, they are blended together to form a mixture. The amount of each constituent used for the coating precursor material depends on the desired properties to be exhibited by the resultant coating. In an embodiment, the coating precursor may include, by weight, one or more of the fluoride eutectics in a range of about 5% to about 80%, one or more of the metals in a range of about 10% to about 70%, and one or more of the low temperature solid lubricants in a range of about 0% to about 20% and one or more high temperature lubricants selected from the group of oxides, nitrides and or carbides in a range of about 0% to about 40%. In another embodiment the fluoride eutectics in a range of about 30% to about 70%, one or more of the metals in a range of about 20% to about 60%, and one or more of the low temperature solid lubricants in a range of about 4% to about 12% and one or more high temperature lubricants selected from the group of oxides, nitrides and or carbides in a range of about 5% to about 18%. In other embodiments, the weight percentage of each constituent may be more or less than the aforementioned ranges.

Next, the coating precursor material may be applied to the substrate, step 206. In one embodiment, the coating precursor material may be mixed with a liquid to form a paste. The liquid may be deionized water, alcohol, or other suitable solvent. In any case, the paste may have a viscosity in a range of from about 50,000 to 300,000 Centipoise, in an embodiment. In another embodiment, the viscosity of the paste may be in a range from about 100,000 to 300,000 Centipoise, but may, in other embodiments, be in a range of from about 100,000 to 250,000 Centipoise. In yet another embodiment, a binder may be added to the paste. For example, suitable binders include organic binders such as ethyl cellulose, nitrocellulose, and acrylic.

The paste may then be applied to the substrate. In an example, the paste may be applied to the substrate by a thick film screen printing process. In an embodiment, a mesh screen is placed over a portion of the substrate to be coated, and the paste is pressed through the mesh onto the substrate. Any marks remaining on the substrate from the mesh may be removed by a subsequent polishing process. In another embodiment, the paste may be formed into a tape and the tape may be transferred to the substrate. In other embodiments, alternate application processes may be employed. For example, the paste may be painted or brushed onto the substrate, or the paste may be sprayed, printed, cast or doctor-bladed onto the substrate.

After the paste is applied to the substrate, it may be air dried, in an embodiment. In another embodiment, the paste may be dried by heating to a drying temperature sufficient to remove substantially all liquid therefrom. In an embodiment, the drying temperature may be below about 200° C. In another embodiment, the drying temperature may be in a range of from about 85° C. to 150° C. In still another embodiment, the drying temperature may be in a range of from about 95° C. to 150° C. In yet still another embodiment, the drying temperature may be in a range of from about 100° C. to 150° C. The drying temperature may be maintained for a time period in a range of from about 5 minutes to 60 minutes, in an embodiment.

Next, the coating precursor material is subjected to a sintering heat treatment to form an intermediate coating, step 208. In an embodiment, the sintering heat treatment may occur at a sintering temperature that is suitable to allow the fluoride in the fluoride eutectic(s) to soften/melt and flow and thereby sinter/braze the metals in the coating precursor material by solid state diffusion and/or act as a flux. To sinter the coating precursor material, the sintering heat treatment may occur in an inert atmosphere, and the sintering temperature may be in a range of about 900° C. to about 1000° C. In an example, the inert atmosphere may be a nitrogen atmosphere, an argon atmosphere or a vacuum. In another example, the sintering heat treatment may occur in a reducing atmosphere, such as in a hydrogen atmosphere or an argon/hydrogen atmosphere. Exposure to the sintering heat treatment may last for a dwell time in a range of about 2 minutes to about 1.0 hour. A length of the sintering heat treatment including heat up, dwell time, and cool-down may last from about 30 minutes to about 3 hours or more. In still other examples, the sintering temperature and length of exposure to the sintering heat treatment may be higher or lower than the aforementioned ranges.

After sintering the first layer thus forming a first intermediate coating, an optional intervening layer may be formed over the first intermediate coating, step 209. In an embodiment, the intervening layer comprises one or more fluoride eutectics. The fluoride eutectics may be substantially identical to that included in the coating precursor material, in an embodiment. In another embodiment, the fluoride eutectics may be a different material than that in the coating precursor material. In any case, the fluoride eutectics may be selected from any of the fluoride eutectics mentioned above or may include one or more different fluoride eutectics. The intervening layer may be applied over the first intermediate coating in a manner similar to how the coating precursor material is applied. According to an embodiment, the intervening layer may be applied to a thickness in a range of about 0.0005 cm to about 0.0075 cm. In other embodiments, the intervening layer may be thinner or thicker than the aforementioned range.

After application, the first intermediate coating with the intervening layer on top is then subjected to a second sintering heat treatment to form a second intermediate coating. The additional sintering heat treatment may be performed under conditions that are substantially similar to the sintering heat treatment described above, in an embodiment. In other embodiments, the second sintering heat treatment may be performed at higher or lower temperatures, depending on the particular fluoride eutectic selected for use as the intervening layer. As a result of including the intervening layer, a less porous composite is formed, which allows a resultant coating to be polished to a lower surface finish and to provide friction and wear benefits.

The intermediate coating (or in some embodiments, an alternative intermediate coating) may be exposed to an oxidizing heat treatment, step 210. The oxidizing heat treatment oxidizes a portion of the metal in the intermediate coating and is performed in air or in another oxygenated atmosphere at an oxidizing temperature that is greater than the temperature to which the resultant component will be exposed. In this way, oxidation is minimized during operation of the resultant component on which the coated substrate will be implemented. In some cases, the oxidizing heat treatment step may allow the intermediate coating to exhibit self lubricating properties and to maintain dimensional properties when subjected to operational temperatures that may be greater than about 427° C., and in some embodiments at least about 648° C. In an example, the oxidizing temperature may be in a range of about 535° C. to about 800° C., and the oxidation heat treatment may occur for a dwell time in a range of about 2 minutes to about 1.0 hour. The length of the oxidizing heat treatment including heat up, dwell time, and cool-down may last from about 30 minutes to about 3 hour or more, in an embodiment. In still other examples, the oxidizing temperature and length of exposure to the oxidizing heat treatment may be higher or lower than the aforementioned ranges. For example, oxidizing temperatures may be employed that may be substantially equal to or near operating temperatures of the resultant component, in an embodiment in which a longer length of exposure is used.

To reduce air friction and susceptibility to galling during bearing operation of the heat-treated intermediate coating, polishing may be performed on the heat-treated intermediate coating to form the solid lubricant coating, step 212. In an embodiment, a surface of the thermally processed and/or oxidized intermediate coating is polished to planarize at least a portion of the coating material to reduce the surface finish of the coating. Polishing may be performed using abrasive pastes, papers, and/or pads, in an embodiment. According to an embodiment, the coating may be polished to a relatively low surface finish of less than about 0.20 micron (8 micro-inches). In other embodiments, the surface finish of the coating may be greater or less than the aforementioned value. In any case, reducing the surface finish to a desired finish allows the resultant component to support higher loads. After the intermediate coating is polished, the substrate including the solid lubricant coating thereon may be formed to shape and inserted into a finished component and/or may be implemented into another larger component and/or may be implemented into an engine, turbocharger, turbomachinery or the like, for use. For example, in the case of a foil bearing, the coated substrate may be laser cut into a desired shape and then formed into a suitably shaped cylinder and implemented onto an engine shaft.

In some embodiments of method 200, a pre-polish step 214 may be employed between steps 208 and 210. The pre-polish step 214 may be included in order to remove a slag-like layer that may form during step 208. By removing the slag-like layer, a more uniform oxidized coating may result after the sintering heat treatment of step 208. Additionally, in some cases, the coating may become more difficult to planarize after the oxidizing heat treatment of step 210, because the coating may harden and polishing a large amount of the coating may be difficult. In any case, the pre-polish step 214 may be performed using abrasive pastes, papers, and/or pads, in an embodiment. According to an embodiment, the coating may be polished to a surface finish of less than about 0.20 micron (8 micro-inches). In other embodiments, the surface finish of the coating may be greater or less than the aforementioned value.

Simple and inexpensive processes of forming solid lubricant coatings on substrates have been provided. By processing the solid lubricant coatings using the aforementioned method, higher operating temperatures as compared to conventionally used processing methods and/or temperatures may be realized, because the materials included for the solid lubricant coating may have improved thermal stability than conventional and/or conventionally-processed materials. Additionally, because the coating includes constituents formed from very fine particles (e.g., particles having sizes in a range of about 10 nm to about 10 microns), the constituents, especially the one or more metals, may have a higher surface area to volume ratio during coating processing and may be more susceptible to oxidation to thereby form metal oxides, which may further improve solid lubricant properties of the coatings. As a result, the heat treated coating may have improved friction-lowering properties over those of conventional solid lubricant coatings.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of forming a solid lubricant coating on a substrate, the method comprising the steps of:
 applying a coating precursor material over the substrate, the coating precursor material comprising:
  a fluoride eutectic comprising at least one of the group consisting of nickel fluoride/cobalt fluoride, barium fluoride/nickel fluoride, cobalt fluoride/barium fluoride, and barium fluoride/boron oxide,
  a metal powder having an average particle diameter in a range of about 10 nanometers to about 10 microns, the metal powder containing at least one metal capable of oxidizing at about 535° C. to about 800° C. in the presence of fluoride, and one or more materials selected from the group consisting of a metal oxide, a glass, a carbide, and a nitride, subjecting the coating precursor material over the substrate to a sintering heat treatment to form a first intermediate coating, the sintering heat treatment occurring at a first temperature in an inert atmosphere or a reducing atmosphere; and exposing the first intermediate coating to an oxidizing heat treatment, the oxidizing heat treatment performed in an oxidizing atmosphere at a second temperature that is less than the first temperature to oxidize a portion of the metal powder in the first intermediate coating.

2. The method of claim 1, wherein:

the method further comprises forming a paste, slurry or paint with the coating precursor material, and the step of applying a coating precursor material over the substrate further comprises applying the paste, slurry or paint onto the substrate.

3. The method of claim 1, wherein the first temperature is in a range of from about 900° C. to about 1000° C.

4. The method of claim 3, wherein the second temperature is in a range of from about 535° C. to about 800° C.

5. The method of claim 1, further comprising the step of drying the layer of precursor material before the step of subjecting the substrate to a sintering heat treatment.

6. The method of claim 1, wherein the metal of the coating precursor material includes one or more materials selected from a group consisting of chromium, cobalt, nickel, molybdenum pre-alloyed with nickel, cobalt or chromium, and tungsten pre-alloyed with nickel, cobalt or chromium.

7. The method of claim 1, wherein the metal oxide or the glass of the coating precursor material includes one or more materials selected from the group consisting of chromic oxide (e.g., $Cr_2O_3$), nickel oxide, aluminum oxide (e.g., $Al_2O_3$), titanium oxide (e.g., $TiO_2$), cerium oxide, cobalt oxide, and boron oxide.

8. The method of claim 1, wherein the carbide or the nitride of the coating precursor material includes one or more materials selected from the group consisting of at least one compound having the chemical formula $M_{n+1}AX_n$, wherein M is at least one early transition metal selected from groups IIIB, IVB, VB, and VIB, A is at least one element selected from groups IIIA, IVA, VA, VIA, and VIIA, X is one or both of carbon and nitrogen, and n is an integer between 1 and 3, chromium aluminum carbide, boron nitride, and tungsten carbide.

9. The method of claim 1, wherein the step of applying a coating precursor material over the substrate further comprises depositing the coating precursor material to a thickness in a range of from about 5 microns to about 75 microns.

10. The method of claim 1, wherein the step of subjecting the precursor material over the substrate to a sintering heat treatment to form an intermediate coating comprises subjecting the substrate to a nitrogen atmosphere.

11. The method of claim 1, further comprising the step of polishing the coating to a surface finish of less than about 0.20 micron (8 micro-inches), after the step of exposing the intermediate coating to an oxidizing heat treatment.

12. The method of claim 1, wherein the step of exposing the intermediate coating to an oxidizing heat treatment further comprises heating the intermediate coating to a temperature that is greater than a predetermined operating temperature of the substrate.

13. The method of claim 1, wherein:

the method further comprises the steps of:

applying an intervening layer over the first intermediate coating, the intervening layer comprising a second fluoride eutectic thus creating a second intermediate coating; and subjecting the second intermediate coating to another heat treatment at a second temperature in an inert or reducing atmosphere to form the second intermediate coating; and the step of exposing the second intermediate coating to an oxidizing heat treatment, the oxidizing heat treatment performed in an oxidizing atmosphere at a third temperature, that is less than the first and second temperatures, to oxidize a portion of the metal in the previous intermediate coatings.

14. A method of forming a solid lubricant coating, comprising:

applying a coating precursor material over a substrate;

heating the coating precursor material in a non-oxidizing atmosphere to produce a sintered intermediate coating having micro-pores over the substrate; and heating the sintered intermediate coating in an oxidizing atmosphere while allowing oxygen to diffuse into the micro-pores of the sintered intermediate coating, react with the plurality of non-oxidized metal particles, and form lubricious metal oxides at least partially filling the micro-pores of the sintered intermediate coating;

wherein the coating precursor material comprises:

a fluoride eutectic comprising at least one of the group consisting of nickel fluoride/cobalt fluoride, barium fluoride/nickel fluoride, cobalt fluoride/barium fluoride, and barium fluoride/boron oxide; and a metal powder comprising a plurality of non-oxidized metal particles having an average particle diameter between about 10 nanometers and about 10 microns, the plurality of non-oxidized metal particles comprising at least one of the group consisting of non-oxidized nickel, cobalt, and chromium particles.

* * * * *